Sept. 2, 1947.  J. D. TELFORD  2,426,716
CONTROLLING DEVICE FOR HORSES
Filed Oct. 9, 1945
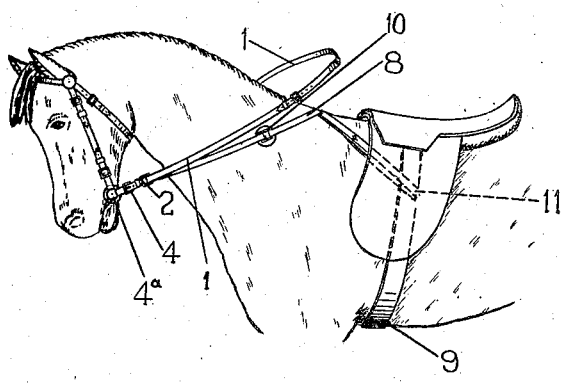
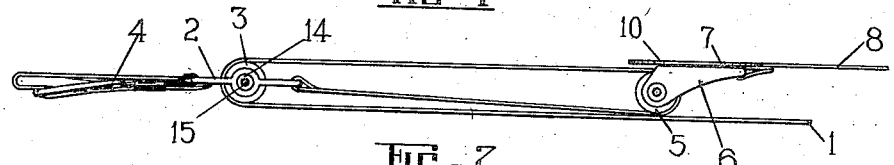
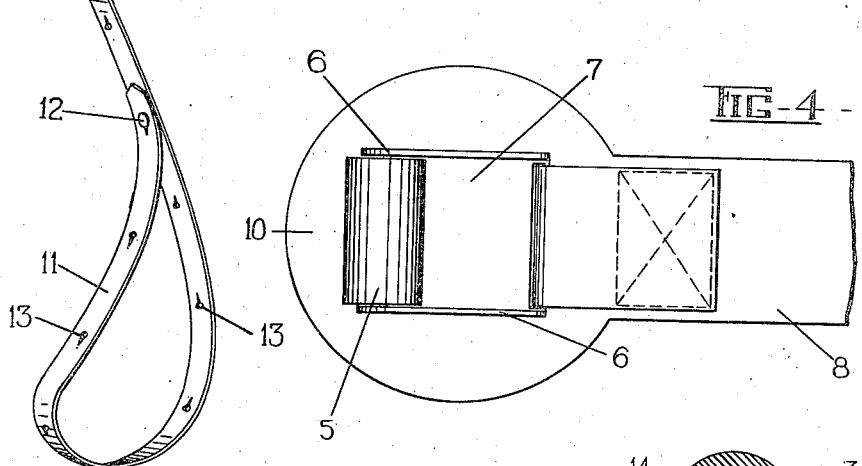
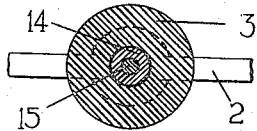
Inventor
J. D. Telford Patented Sept. 2, 1947

2,426,716

UNITED STATES PATENT OFFICE 2,426,716

CONTROLLING DEVICE FOR HORSES

John Degiden Telford, Palmerston North,
New Zealand

Application October 9, 1945, Serial No. 621,248

1 Claim. (Cl. 54—36)

The invention relates to bridles the reins of which, instead of being attached directly to the bit of the bridle, are attached to, and passed through pulley blocks, connected by straps with the bit, and a saddle girth, so that pull exerted on the reins, by the rider or driver of an animal on which the bridle is used, is increased in its effect on the bit, owing to the purchase obtained per medium of the pulley blocks, thereby enabling animals which "pull on the bit" to be effectively restrained, without undue effort, by the rider or driver.

The object of the invention, is to provide improvements in the aforesaid type of bridle, so as to simplify the construction of same, render it more efficient in operation, more comfortable on the animal, and also so as to enable adjustments to be readily made to suit different animals.

A bridle having incorporated therein, the improvements according to the invention, is provided, for use at each side of an animal on which the bridle is placed, with a frame having a roller mounted centrally therein; a strap with a buckle thereon connecting said frame with the bit of the bridle; a roller mounted between opposed lugs on a rearwardly extending plate located at the rear of said frame; a strap attached to said plate, and adapted to cross the withers of the animal to the opposite side thereof, to connect said plate with harness on the animal; a rein attached to the frame, and passed rearwardly and inwardly around the roller on the plate, then forwardly and outwardly around the roller in the frame; and then in a direction rearwardly of the animal.

Other improvements are comprised in the invention, which will however be more particularly described in conjunction with the accompanying drawing, wherein:

Figure 1 is a side elevation showing the bridle with the improvements therein in use on a saddle horse, Figure 2 a plan view (enlarged) of one side of the bridle removed from the horse, Figure 3 a detail view of means for adjusting the length of the straps which cross the withers of the animal, Figure 4 a part elevation, showing the manner of forming the strap ends connected with the plates, and the mounting of the latter thereon, and Figure 5 a sectional elevation of a roller and its internal roller bearing.

The bridle reins 1, used one at each side of an animal, are attached at their forward ends, each to the rear end of a frame 2, having mounted centrally therein a roller 3, said frame 2 being connected at its forward end by a strap 4, with a ring 4a of the bridle bit, the strap 4 being provided with the usual buckle adjusting means, for varying its length.

Each rein 1 is led rearwardly from a frame 2, and is passed rearwardly and inwardly around a roller 5 mounted between opposed lugs 6 on the forward end of a plate 7 attached to a strap 8, which is passed across the withers of the animal and secured to a suitable part of harness thereon, as for instance to a saddle girth 9, at the opposite side of the animal.

From the roller 5 the rein 1 is brought forward again and is passed forwardly and outwardly around the roller 3 on the frame 2, and is then taken or led rearwardly again to either be joined with the opposite rein 1, to provide riding bridle reins, or is extended rearwardly as far as required, to provide, with the opposite extended rein, driving reins of desired length.

The straps 8 are each provided at their forward ends with an enlargement 10, on which the plates 7 with the opposed outstanding lugs 6 and roller 5 are secured by doubled sections of leather or the like passed through slots in the rear ends of the plates 7, and secured as by stitching to the strap 8 or enlargement 10, so that the latter is hingedly secured to the enlargement 10, which serves as a pad between the plate 7 and the animal.

The rear ends of the straps 8 adapted to be attached to a saddle girth 9 or other harness part, are formed with adjustable loops 11 for facilitating the attachment, the loop 11 being capable of being increased or shortened in length to vary the length of the strap 8, by a stud 12 on one portion of the strap 8, being entered in a selected hole of a series of holes 13 in another portion of the strap 8, after same has been doubled at its rear end.

The rollers 3 and 5 are each mounted on a roller bearing 14 on a spindle 15 fixed in the frame 2, or in the lugs 6 of the plate 7.

The lengthening of the riding bridle reins 1, for driving purposes, can be effected by means of extra lengths of reins, preferably secured by buckles to the free ends of said reins 1, as many extra rein lengths as may be found necessary or desirable, being used, and if desired extra rein lengths may be secured to the reins 1, or to other lengths, by one of the ends to be joined together having opposed recesses formed in its edges, and the other end having a T-shaped slot formed therein to receive and retain said recessed end.

What I do claim and desire to obtain by Letters Patent of the United States of America is:

A controlling device for horses comprising a bridle having a bit, straps formed with enlargements at their forward ends and adapted to cross at the withers and to be attached at their rear ends to a portion of a harness carried by the horse, plates with outwardly and forwardly extending lugs secured at their rear ends to the forward portions of said straps so as to bear against said enlargements, rollers mounted between said lugs, adjustable strap means carried by said bit at each side thereof, roller means carried by said adjustable strap means, reins attached to said adjustable strap means, passed rearwardly around the rollers carried by said lugs, then forwardly to and outwardly around the roller means carried by said adjustable strap means, and finally rearwardly into a position to be grasped by a rider or driver.

JOHN DEGIDON TELFORD.

REFERENCES CITED

The following references are of record in the file of this patent:

FOREIGN PATENTS

| Number | Country | Date |
|---|---|---|
| 1,739 | Great Britain | Feb. 3, 1915 |